United States Patent

[11] 3,540,554

| [72] | Inventors | Richard T. Burnett;<br>Maurice P. Pauwels, South Bend, Indiana |
|---|---|---|
| [21] | Appl. No. | 756,135 |
| [22] | Filed | Aug. 29, 1968 |
| [45] | Patented | Nov. 17, 1970 |
| [73] | Assignee | The Bendix Corporation<br>a corporation of Delaware |

[54] HEAT SHIELD FOR BRAKE ADJUSTER
11 Claims, 6 Drawing Figs.

[52] U.S. Cl................................................. 188/79.5,
188/152, 188/264
[51] Int. Cl.................................................. F16d 51/52
[50] Field of Search........................................ 188/1, 2,
79.5GE, 78.22, 152.82, 2641

[56] References Cited
UNITED STATES PATENTS
3,187,848  6/1965  Shellhause et al. ............ 188/264(I)X
3,246,723  4/1966  Pauwels........................188/79.5(GE)X Primary Examiner—Duane A. Reger
Attorney—Plante, Hartz, Smith & Thompson ABSTRACT: This invention relates to an automatic adjuster for a brake comprising a housing, a rotatable adjuster nut arranged for axial movement in said housing and having teeth thereon, a nonrotatable adjuster screw fixed to a brake shoe and threadedly connected to the adjuster nut, pawl means engaging the teeth to rotate the adjuster nut relative to the adjuster screw during return of the adjuster screw and the adjuster nut, as a unit, to the brake released position for effecting an extension of the adjuster screw, a flexible boot engaging said non-rotatable adjuster screw and said housing to exclude contaminants, and an expandable metallic member suitably covering said flexible boot to preclude heat and heated particles from damaging said flexible boot.

BRAKE RELEASED POSITION.

Patented Nov. 17, 1970
3,540,554
Sheet 1 of 3
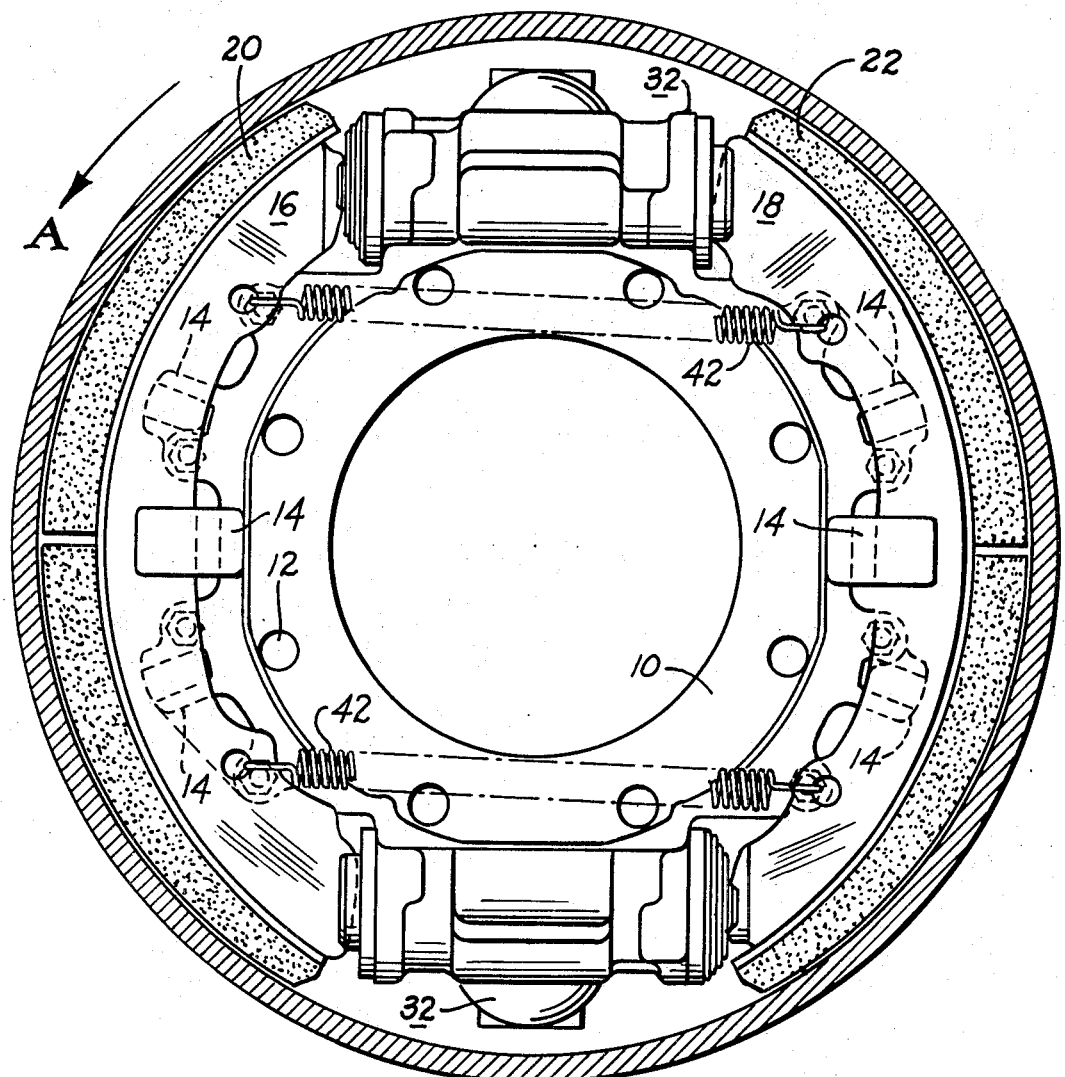
FIG_1
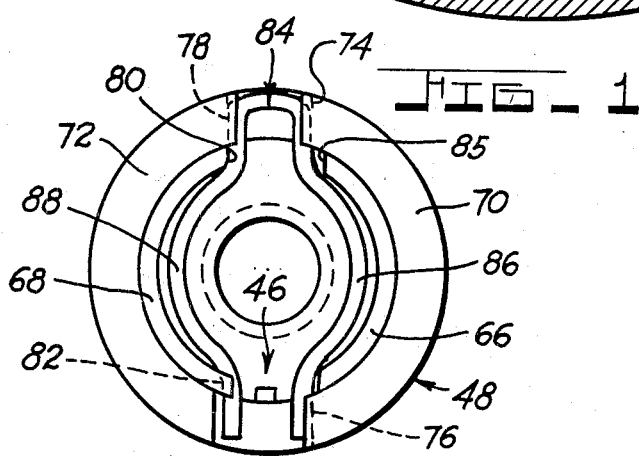
FIG_4
INVENTORS
RICHARD T. BURNETT.
MAURICE P. PAUWELS.
BY
Plante, Arens, Hartz and O'Brien
ATTORNEYS Patented Nov. 17, 1970
3,540,554
Sheet 2 of 3
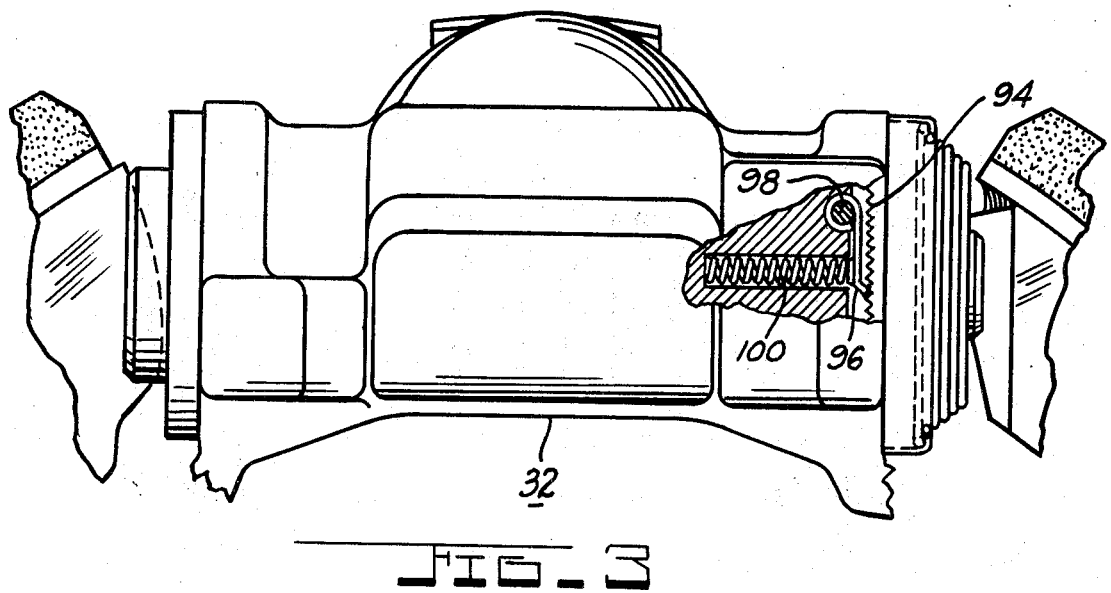
FIG_3
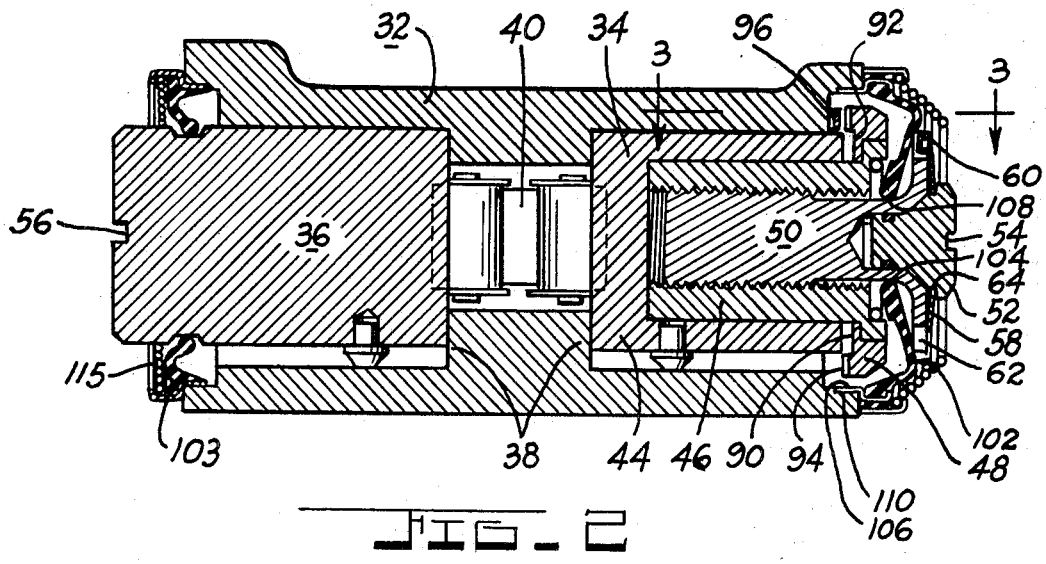
FIG_2
INVENTORS
RICHARD T. BURNETT.
MAURICE P. PAUWELS.
BY
Plante, Arens, Hartz and O'Brien
ATTORNEYS

BRAKE RELEASED POSITION.

BRAKE APPLIED POSITION.

INVENTORS
RICHARD T. BURNETT.
MAURICE P. PAUWELS.
BY
Plante, Arens, Hartz and O'Brien
ATTORNEYS

HEAT SHIELD FOR BRAKE ADJUSTER

BACKGROUND OF THE INVENTION

It has been found necessary, based on experience gained in actual operation, to shield or seal the operable elements of the adjuster from the environment experienced in the general area of the brake, and specifically the brake shoes, to insure high reliability performance from said adjuster. Thus, the operable elements of the adjuster have generally been sealed against contaminants by rubberlike boots. However, rapid deterioration and failure of the boots has been experienced from localized high ambient temperatures and heated particles of dust and worn brake lining being projected onto the boots during braking applications. Moreover, sufficient space is not available in the restricted area where the adjuster must be installed, to accommodate the use of conventional shielding techniques while still providing for the required axial expandability of said adjuster.

SUMMARY OF THE INVENTION

It is an object of this invention to provide an automatic adjuster having a heretofore unattainable high reliability performance over a prolonged period of time.

It is an object of this invention to provide an automatic adjuster with a flexible boot means to exclude contaminants from the operable elements of said adjuster.

It is an object of this invention to provide an automatic adjuster with an expandable metallic cover and heat shield over said flexible boot means to preclude damage to said flexible boot means from heat and heated particles of dust and worn brake linings.

It is an object of this invention to provide a heat shield for the sealing member of a brake assembly to thereby protect said member from excessive heat generated during a braking cycle.

Other objects and features of the invention will be apparent from the following description of the brake adjuster taken in connection with the accompanying drawings.

BRIEF DESCRIPTION OF THE DRAWINGS

FIG. 1 is a front elevational view of the brake assembly;

FIG. 2 is a sectional view of the actuator and adjustor mechanisms of the brake assembly of FIG. 1, which are illustrated in the shoe retracted position;

FIG. 3 is a view taken along line 3-3 of FIG. 2;

FIG. 4 is a view of the adjuster nut, ratchet assembly in a normal operating relationship relative to each other;

DESCRIPTION OF THE PREFERRED EMBODIMENT

Figure 5:
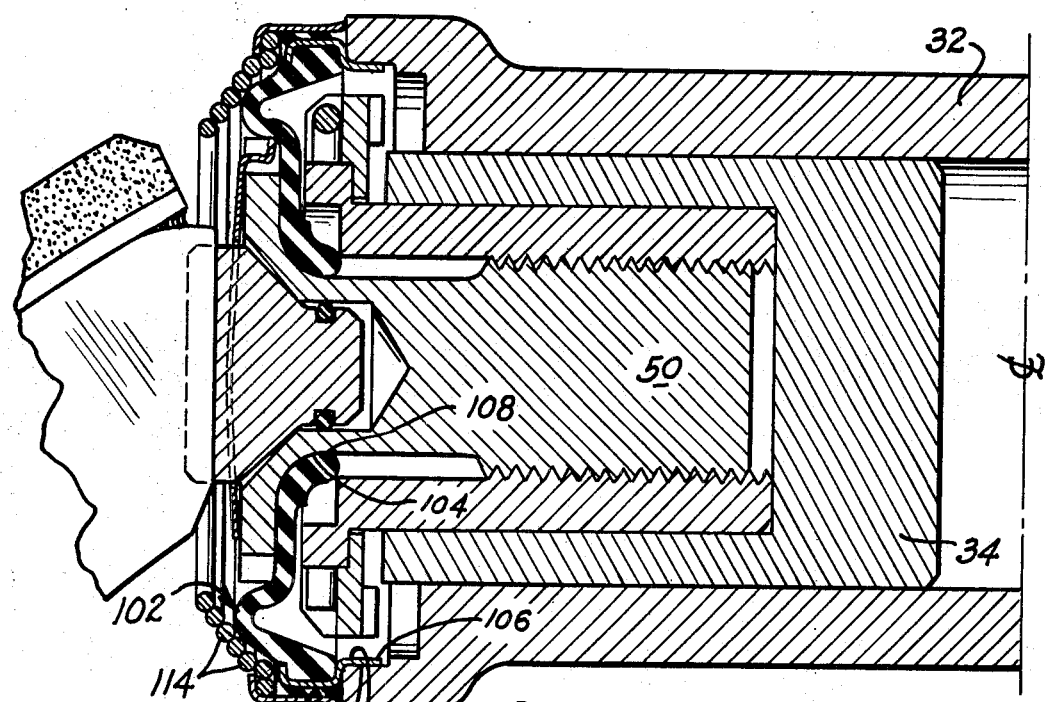
FIG. 5 is an enlarged fragmented view of the flexible boot means and expandable metallic member, shown in the brake released position.

Referring to FIG. 1, the brake assembly illustrated therein has a torque spider 10 which is adapted to be mounted on a stationary part of a vehicle, such as an axle flange, by inserting bolts (not shown) through the circumferentially spaced holes 12. The torque spider has supporting ledges 14 for slidably supporting a pair of T-shaped brake shoes 16 and 18, having friction linings 20 and 22, respectively. The torque spider also has a pair of diametrically opposed adjusters having cylinder housings 32 formed integrally therewith, each of which contains a slidable plunger assembly 34 and a slidable plunger 36, as can best be seen in FIG. 2. A pair of anchor flanges 38 is located within each cylinder housing. The plunger assembly 34 and the plunger 36 each abut the anchor flanges 38 during the brake released position, and one of the plunger or plunger assemblies anchor on the anchor flanges 38 during braking, depending upon the direction of drum rotation. The plunger assembly 34 and the plunger 36 are spread apart by a wedge member 40 which may be of any well known arrangement such as illustrated in U.S. Pat. No. 2,527,126 issued to Goepfrich and U.S. Pat. No. 3,362,506 issued to Mossey. A pair of shoe-to-shoe return springs 42 returns the shoes and thereby the plungers to the brake released position.

Referring again to FIG. 2, the plunger assembly 34 comprises a hollow sleeve 44, a rotatable member or adjuster nut 46 carrying a toothed ratchet member 48 thereon, and a non-rotatable member or adjuster screw 50. The adjuster nut 46 has a hollow interior, the sidewalls of which are threaded for rotatably receiving the adjuster screw 50 which is T-shaped in cross section. A stud 52 is secured to the adjuster screw 50 for relative rotation therewith, and has a slot 54 which slidingly receives one end of its respective brake shoe. The plunger 36 has a slot 56 at its outer end for slidably receiving one end of its respective brake shoe.

A spring clip 58 having a depending flange 60 disposed within one of a plurality of notches 62 on the outer periphery of the adjuster screw 50 has a central opening 64 with a plurality of flats which mate with flats on the stud 52 to prevent relative rotation between the stud 52 and the clip 58. Since the shoe 18 is disposed within the slot 54, rotation of the stud is prevented by the shoe and, therefore, rotation of the adjuster screw 50 is normally prevented since the clip 58 is unable to rotate. However, upon applying a tool to the notched periphery 62 of the screw 50, the screw 50 may be turned with the flange 60 slipping out of the notches during manual turning of the screw 50 to effect manual adjustment.

Referring now to FIG. 4, a pair of circumferentially spaced arcuate flanges 66 and 68 is located on the adjuster nut 46 and extends in an axial direction of the bore and a pair of circumferentially spaced arcuate flanges 70 and 72 is located on the ratchet member 48 and encircles the flanges 66 and 68, respectively. The end edges 74 and 76 of the flange 70, the edge 78 of the flange 72, the edges 80 and 82 of the flange 68, form abutments for a generally U-shaped or hairpin-shaped resilient member 84, which comprises a pair of legs 86 and 88. The abutment edges 74, 76, 82 and 78 define a groove to receive portions of the resilient member 84 therein. The closed end of the resilient member 84 is received within the abutment grooves 74 and 78 of the ratchet 48 and the free end of the leg 86 is received in the groove 76 of the ratchet 48 and the free end of the leg 88 is received in the groove 82 of the rotatable adjuster nut 46. The adjuster nut 46 has an annular shoulder 90 thereon which is engaged by an annular base portion 92 of the ratchet 48. Since the resilient member 84 is located within the respective grooves of the ratchet member 48 and the adjuster nut 46, the ratchet member is held in a fixed axial relationship relative to the adjuster nut 46. The resilient leg 86 acts on the abutment 76 to urge the ratchet 48 in a counterclockwise direction. The closed end of the resilient member 84 engages the abutment 80 on the adjuster nut 46 to limit the rotation of the ratchet 48 in a counterclockwise direction on the adjuster nut 46 and fix the nominal operating position of the ratchet 48 on the adjuster nut 46. The closed end of the resilient member 84 is narrower than the distance between the abutment edges 80 and 85 of the flanges 68 and 66, respectively, to provide a clearance for sliding of the closed end of the resilient member 84 and thus relative rotation of the ratchet 48 and the adjuster nut 46.

The ratchet member 48 has a plurality of teeth 94 on the undersurface thereof which is adapted to be engaged by a pawl 96 pivotally mounted on a pin 98 secured to the housing 32, as best shown in FIG. 3. The end of the pawl 96 is biased by a spring 100 into engagement with the teeth 94. The relationship between the pawl 96 and the teeth 94 is such that upon return of the plunger assembly 34 to the brake release position, the pawl 96 will effect a rotational force on the ratchet 48 tending to rotate the same in a clockwise direction. The spring force of the legs 86 and 88 is such that upon normal release of the brake, the force exerted on the ratchet 48 by the pawl 96 will be less than the spring force of the legs 86 and 88 whereby the rotational force exerted on the ratchet 48 will be transmitted through the resilient member 84 to the adjuster nut 46 to rotate the same in a clockwise direction. If the force of the pawl 96 exerted on the ratchet 48 is greater than the spring force of the legs 86 and 88, then the ratchet 48 will rotate in a clockwise direction relative to the adjuster nut 46 against the force of the resilient member 84. The specific adjuster mechanism shown and a modified form of the adjuster nut and ratchet member are illustrated and claimed in U.S. Pat. No. 3,246,723 issued to E. M. Pauwels.

As will be understood by those skilled in the art, the operable structure of the brake adjuster, as shown in FIG. 2, may be functionally sensitive to contaminants and fail to operate satisfactorily which results in premature manual adjustment or general maintenance. Thus, a flexible boot means 102 having an inner opening 104 and an outer annular mounting surface 106, is suitably mounted respectively on an unthreaded portion 108 of the adjuster screw 50 and the annular flange 110 of the housing 32 to exclude foreign matter from the adjuster. Referring briefly to FIG. 5, it can be seen that an annular metal ring 112 is molded integrally with the flexible boot means 102 for frictionally and sealingly engaging the annular flange 110 to insure that the flexible boot means 102 remains reasonably secured to the housing 32 during operation. It has been found that the flexible boot means performs satisfactorily when made of rubber or rubberlike substances; however, any resilient material that would shield from contaminants would provide the necessary protection.

Figure 6:
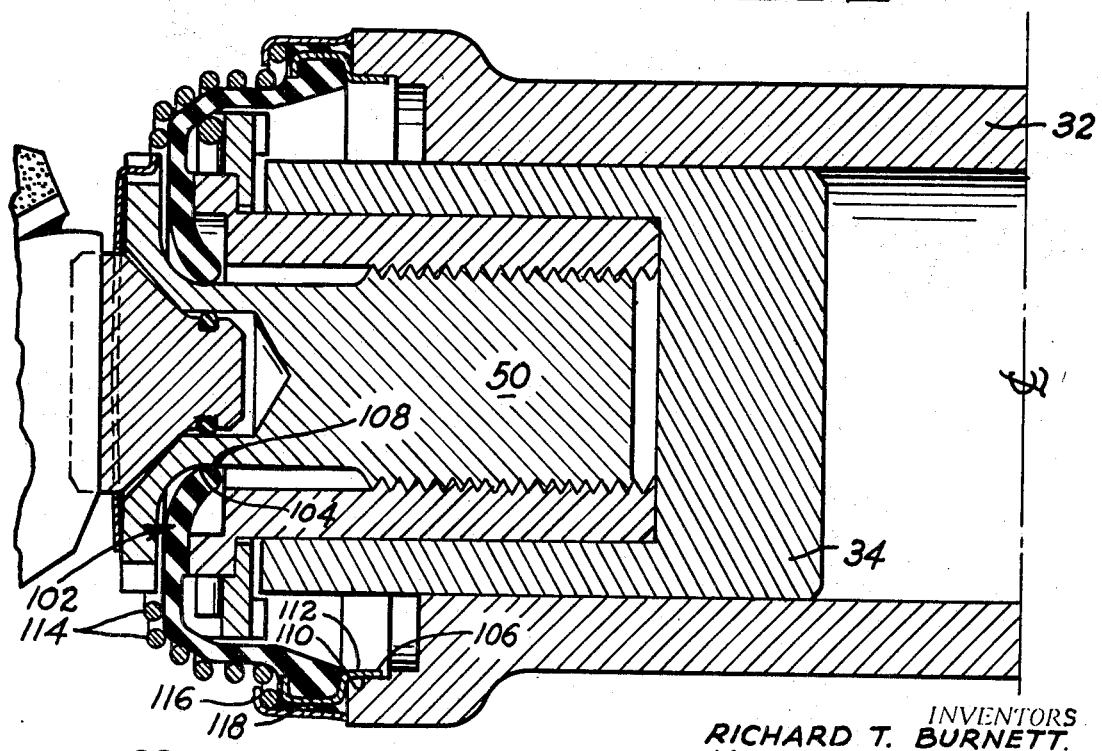
FIG. 6 is an enlarged fragmented view of the flexible boot means and expandable metallic member, shown in the brake applied position.

Although numerous resilient or rubberlike materials have been found satisfactory by those skilled in the art for precluding entry of contaminants into the adjuster mechanisms, none have satisfactorily performed in terms of operational life in the high temperature environment adjacent to the ends of the braking shoes where excessive localized temperatures prevail and heated foreign particles, comprised of worn pieces of brake shoe lining and dust, are projected from the trailing edge of the brake shoe upon braking application. The high ambient heat and heated particles are communicated around and on to the flexible boot means 102 so as to cause rapid deterioration of the flexible boot means thus destroying its protective capabilities. The present invention provides an expandable metallic member 114 including a cap 116 which frictionally engages the outer annular periphery 118 of the flexible boot means 102 to accomplish its installation. The expandable metallic member 114 is shown comprised of a resilient wire having a spiral construction so as to form a protective cone around the flexible boot means 102 in the brake release position, as best shown in FIG. 5. As understood by those skilled in the art, the expandable metallic member 114 could well be comprised of a plurality of independently relatively movable axially extending segments or a series of axially telescoping members. The conical form of an expandable metallic member 114 thus provides a heat shield for the flexible boot means 102 protecting it against the high ambient temperature of the environment and specifically precludes the hot brake lining particles from striking the flexible boot means 102 and incurring permanent damage thereto. Referring now to FIG. 6, the brake adjuster is shown in the brake applied position wherein the slidable plunger assembly 34 is projected axially outward from the housing 32 by the actuator or wedge member 40 so that the brake shoes (not shown) frictionally engage the drum to accomplish the braking application. As can be seen in the drawing, the flexible boot means 102 has its inner opening 104 in frictional engagement with the unthreaded portion 108 of the adjuster screw 50 and its outer annular flange 110 frictionally engaging said housing 32. As the flexible boot means 102 is expanded axially the metallic member 114 conforms to the outer shape of the flexible boot means 102 and stretches with it as it moves axially. When the braking action is released, the slidable plunger assembly 34 and the flexible boot means 102 return to their original or brake released position and likewise the expandable metallic member assumes its brake released position as shown in FIG. 5.

Referring again to FIG. 2, a flexible boot means 103 is interposed between the housing 32 and the plunger 36 to further prevent contaminants from entering the assembly. An expandable metallic member 115, comprised of a resilient wire having a spiral construction, may be suitably installed over said boot means 103 to protect same from the high ambient temperature and heated particles as hereinabove explained.

MODE OF OPERATION OF THE PREFERRED EMBODIMENT

In operation, assuming rotation of the brake drum in the direction of Arrow A, actuation of the wedge member 40 will spread the plunger assembly 34 and the plunger 36 apart with the shoes 16 and 18 anchoring on flanges 38 through the plungers 36. The pawl 96 is pivoted on pin 98 by the spring 100 to follow the axial movement of the teeth 94 away from the housing. If the plunger assembly 34 has moved a predetermined distance in a brake actuating direction, then the pawl 96 will pick up a new tooth on the ratchet 48 and upon release of the actuating pressure on the wedge, the return springs 42 will return the plunger assembly 34 to its normally released position against the anchoring flange 38. During the return stroke of the plunger assembly 34 to its released position, the pawl 96 will be pivoted in a direction toward the housing thereby exerting a clockwise rotational force on the ratchet 48. The rotational force on the ratchet 48 will be transmitted through the resilient member 86 to the adjuster nut 46 to turn the same thus extending the adjuster screw 50 in an axial direction a given amount effecting automatic adjustment of the brake.

Referring specifically now to FIGS. 5 and 6, the brake adjuster is first shown in the brake released position, and as the wedge member 40 is actuated to engage the brake shoes 16 and 18 with their associated drum, the slidable plunger assembly 34 travels axially to the brake applied position. As the wedge member 40 is actuated to apply the brakes, the flexible boot means 102 is carried axially away from the housing 32 to follow the movement of the adjuster screw 50. When the flexible boot means 102 moves axially and deflects the expandable metallic member 114 it causes the metallic member 114 to conform to the shape of the boot means 102 and travel further with it. Upon release of the wedge member 40 to the brake released position, both the flexible boot means 102 and the expandable metallic member 114 return to their original shapes.

Likewise, upon brake application, plunger 36 (FIG. 2) will be expanded toward the brake drum. Boot means 103 will be carried away from the housing 32 by plunger 36. Thus also, the metallic member 115 will expand to conform to the shape of boot means 103. Upon release of the wedge member 40 to the brake released position, both the boot means 103 and the expandable metallic member 114 return to their original positions and shapes.

Obviously, many modifications and variations of the present invention are possible in the light of the above teachings. It is intended to cover all changes and modifications of the embodiment set forth herein which do not constitute departures from the spirit and scope of the invention.

We claim:

1. In a brake having an adjuster operatively interposed between an actuator and a brake shoe and being responsive to a braking application comprising:
    said adjuster having interengaging operatively extendible portions to accomplish adjustment for brake shoe wear;
    a flexible boot means carried by said adjuster to exclude contaminants from said interengaging portions; and
    said flexible boot means being covered by an expandable member to preclude heat and heated particles from damaging said flexible boot.

2. A brake adjuster as recited in claim 1, wherein said expandable member is comprised of a plurality of independently relatively moveable axially extending segments.

3. A brake adjuster as recited in claim 1, wherein said expandable member is comprised of wire having a spiral construction.

4. In a brake having an adjuster operatively interposed between an actuator and a set of brake shoes and being responsive to a braking application comprising:
a housing member;
a bore in said housing member;
a plunger assembly mounted in said bore for slidable movement relative to said housing member in a brake applying direction and in a return direction;
said plunger assembly comprising a nonrotatable threaded member and a rotatable member threadedly connected to said nonrotatable member;
a ratchet rotatably mounted on said rotatable member;
means including resilient means drivingly connecting said ratchet to said rotatable member;
said resilient means urging said ratchet member into a normal driving position relative to said rotatable member;
pawl means operatively connected to said housing and urged into engagement with said ratchet member;
said pawl means being arranged relative to said ratchet member to impart a rotational force thereon upon return movement of said plunger assembly, whereby said rotational force imparted on said ratchet member is transmitted through said resilient means to effect rotation of said rotatable member upon normal return movement of said plunger assembly and said pawl means will effect rotational movement of said ratchet member relative to said rotatable member against the force of said resilient means upon return movement of said plunger assembly;
a flexible boot means sealingly engaging said nonrotatable member and said housing member to exclude contaminants from therebetween; and
said flexible boot means being covered by an expandable member to preclude heat and heated particles from damaging said flexible boot.

5. A brake adjuster as recited in claim 4, wherein said expandable member is comprised of a plurality of independently relatively moveable axially extending segments.

6. A brake adjuster as recited in claim 4, wherein said expandable member is comprised of wire having a spiral construction.

7. An expandable member as recited in claim 3 and further including an annular cap portion extending axially from its outer periphery.

8. An expandable member as recited in claim 6 and further including an annular cap portion extending axially from its outer periphery.

9. In a brake:
a drum mounted for rotation with a member to be braked;
a backing plate;
a pair of brake shoes slidably mounted on said backing plate;
a housing mounted on said backing plate between adjacent ends of said shoes;
actuating means slidable in said housing;
said actuating means being operably connected to said brake shoes for forcing the latter against said drum;
flexible boot means interconnecting the housing and the actuating means to exclude contaminants from said housing; and
an expandable member carried by said housing overlying said boot means to prevent heat and heated particles from damaging the latter.

10. A brake, as recited in claim 9, wherein said expandable member is comprised of a plurality of independently relatively movable axially extending segments.

11. A brake, as recited in claim 9, wherein said expandable member is comprised of wire having a spiral construction.